United States Patent
Inagaki et al.

(10) Patent No.: US 11,731,412 B2
(45) Date of Patent: Aug. 22, 2023

(54) PRODUCTION METHOD FOR FILM LAMINATE

(71) Applicant: NITTO DENKO CORPORATION, Ibaraki (JP)

(72) Inventors: Junichi Inagaki, Ibaraki (JP); Takeshi Murashige, Ibaraki (JP); Kazuhito Hosokawa, Ibaraki (JP); Toshihiro Kanno, Ibaraki (JP); Kota Nakai, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/189,638

(22) Filed: Mar. 2, 2021

(65) Prior Publication Data
US 2021/0178705 A1 Jun. 17, 2021

Related U.S. Application Data

(62) Division of application No. 16/345,010, filed as application No. PCT/JP2017/038011 on Oct. 20, 2017, now Pat. No. 10,960,610.

(30) Foreign Application Priority Data

Oct. 26, 2016 (JP) .................. 2016-209642

(51) Int. Cl.
*B32B 37/00* (2006.01)
*B29C 65/48* (2006.01)
(Continued)

(52) U.S. Cl.
CPC .......... *B32B 37/0046* (2013.01); *B29C 65/48* (2013.01); *B29C 66/72* (2013.01); *C03C 17/32* (2013.01); *B29L 2009/00* (2013.01)

(58) Field of Classification Search
None
See application file for complete search history.

(56) References Cited

U.S. PATENT DOCUMENTS

| 4,132,567 A | 1/1979 | Blackwood |
| 6,815,070 B1 | 11/2004 | Burkle et al. |

(Continued)

FOREIGN PATENT DOCUMENTS

| CN | 105073412 A | 11/2015 |
| CN | 105451983 A | 3/2016 |

(Continued)

OTHER PUBLICATIONS

Abstract of JP-62009941-A (Year: 1987).*

(Continued)

*Primary Examiner* — Christopher T Schatz
(74) *Attorney, Agent, or Firm* — WHDA, LLP

(57) ABSTRACT

Provided is a production method for a film laminate by which a tough film can be bonded to a brittle film while the breakage of the brittle film is prevented. The production method for a film laminate of the present invention includes bonding a tough film having an elongated shape to a brittle film having an elongated shape while conveying the brittle film, wherein the method includes bonding the tough film and the brittle film to each other by bringing the tough film close to the brittle film, followed by blowing of a gas from a side of the tough film opposite to the brittle film.

7 Claims, 1 Drawing Sheet

(51) Int. Cl.
  B29C 65/00 (2006.01)
  C03C 17/32 (2006.01)
  B29L 9/00 (2006.01)

(56) References Cited

U.S. PATENT DOCUMENTS

| | | |
|---|---|---|
| 6,853,123 B1 | 2/2005 | Nattermann et al. |
| 10,960,610 B2 * | 3/2021 | Inagaki .................. B29C 66/72 |
| 2007/0196588 A1 | 8/2007 | Shinjo et al. |
| 2010/0276066 A1 | 11/2010 | Kondo |
| 2013/0133809 A1 | 5/2013 | Kondo |
| 2014/0367030 A1 | 12/2014 | Beam et al. |
| 2015/0314572 A1 | 11/2015 | Murashige et al. |
| 2016/0039183 A1 | 2/2016 | Murashige et al. |
| 2017/0036876 A1 | 2/2017 | Murashige et al. |

FOREIGN PATENT DOCUMENTS

| | | | |
|---|---|---|---|
| JP | 62009941 A | * | 1/1987 |
| JP | H10-253825 A | | 9/1998 |
| JP | 2001-113631 A | | 4/2001 |
| JP | 4122139 B2 | | 7/2008 |
| JP | 2009/093505 A | | 4/2009 |
| JP | 2016-527157 A | | 9/2016 |
| KR | 2006-0007201 A | | 1/2006 |
| KR | 2010-0098368 A | | 9/2010 |
| TW | 231807 B | | 5/2005 |
| TW | 201500190 A | | 1/2015 |
| WO | 2009/093505 A1 | | 7/2009 |
| WO | 2014/088052 A1 | | 6/2014 |
| WO | 2014/148525 A1 | | 9/2014 |
| WO | 2014/204936 A1 | | 12/2014 |

OTHER PUBLICATIONS

Office Action dated Jun. 3, 2021, issued in counterpart TW application No. 106136697, with English translation. (11 pages).
International Search Report dated Nov. 28, 2017, issued in counterpart application No. PCT/JP2017/038011, w/ English translation (5 pages).
Office Action dated Aug. 21, 2020, issued in counterpart KR Application No. 10-2019-7011594, with English Translation. (14 pages).
Office Action dated Jul. 27, 2020, issued in counterpart KR Application No. 201780066856.0, with English Translation. (17 pages).
Extended (Supplementary) European Search Report dated Nov. 17, 2020, issued in counterpart EP Application No. 17866119.5 (7 pages).
Office Action dated Apr. 1, 2021, issued in counterpart CN Application No. 201780066856.0, with English translation. (18 pages).
Mei, Ziqiang, Dictionary of Textiles, China Textile Press, p. 496, Jan. 31, 2007, with English Translation; Cited in CN Office Action dated Apr. 1, 2021. (8 pages).
China Heavy Machinery Industry Association, "China Heavy Machinery Selection Manual (Metallurgical and Heavy Forging Equipment)", Metallurgical industry press 2015, p. 179, Mar. 31, 2015, with English Translation; Cited in CN Office Action dated Apr. 1, 2021. (8 pages).
Taolin MA, Packaging Technology, Second Edition, Wuhan University Press, pp. 258-263, Sep. 2009, with English translation; Cited in CN Office Action dated Jan. 10, 2022. (15 pages).
Decision of Rejection dated Jan. 10, 2022, issued in counterpart CN patent application No. 201780066856.0 with English translation. (19 pages).
Office Action dated Apr. 26, 2022, issued in counterpart JP application No. 2020-216536, with English translation. (5 pages).

* cited by examiner

CONVEYING DIRECTION →

PRODUCTION METHOD FOR FILM LAMINATE

CROSS-REFERENCE TO RELATED APPLICATION

This application is a divisional of U.S. patent application Ser. No. 16/345,010 filed on Apr. 25, 2019, which is a U.S. National Stage of International Application No. PCT/JP2017/038011 filed on Oct. 20, 2017, each of which claims benefit of Patent Application No. 2016-209642 filed in Japan on Oct. 26, 2016, the entire contents of which are hereby incorporated by reference.

TECHNICAL FIELD

The present invention relates to a production method for a film laminate including a brittle film and a tough film.

BACKGROUND ART

A glass material, a composite containing the glass material, or the like has heretofore been used in a member forming an image display apparatus, such as a substrate for a display element, a sealing material for an OLED element, or a front protective sheet. In addition, in recent years, the weight saving and thinning of the image display apparatus have been progressing, and hence the use of a thinner glass material has been required. The glass material originally involves a problem in that its handleability is poor owing to its brittleness, and along with its thinning, the problem has become remarkable.

In view of the foregoing, in the production of a brittle film, such as a glass film, a possible method of preventing breakage during a process to secure handleability is to protect the brittle film with a tough film.

CITATION LIST

Patent Literature

[PTL 1] JP 4122139 B2

SUMMARY OF INVENTION

Technical Problem

However, in the case where a brittle film, such as a glass film, is extremely thin, even when a tough film is bonded to the brittle film, a problem in that the brittle film is broken occurs. In particular, when the brittle film is conveyed while having waviness resulting from a production process for the film or the like, at the time of the bonding, a pressure to be applied to the brittle film does not become constant, and hence the brittle film is liable to be easily broken.

The present invention has been made to solve the conventional problem, and an object of the present invention is to provide a production method for a film laminate by which a tough film can be bonded to a brittle film while the breakage of the brittle film is prevented.

Solution to Problem

According to one embodiment of the present invention, there is provided a production method for a film laminate, including bonding a tough film having an elongated shape to a brittle film having an elongated shape while conveying the brittle film, wherein the method includes bonding the tough film and the brittle film to each other by bringing the tough film close to the brittle film, followed by blowing of a gas from a side of the tough film opposite to the brittle film.

In one embodiment, the brittle film has a thickness of from 20 μm to 300 μm.

In one embodiment, a gas pressure at a time of the blowing of the gas is from 0.01 MPa to 1 MPa.

In one embodiment, the blowing of the gas is performed with a gas jetting apparatus including a gas jetting port, and a distance between the gas jetting port and the brittle film is from 1 mm to 500 mm.

In one embodiment, a ratio of a width of the tough film to a width of the brittle film is from 1% to 110%.

In one embodiment, the tough film has an adhesive strength to the brittle film of from 0.005 N/25 mm to 10 N/25 mm.

In one embodiment, the production method for a film laminate includes feeding the tough film having an elongated shape, and applying an adhesive onto the tough film and/or the brittle film, followed by bonding of the tough film and the brittle film.

In one embodiment, the tough film is subjected as a tough film with an adhesion layer to the production method for a film laminate, and the method includes feeding the tough film having an elongated shape, and applying an adhesive onto the tough film to form the tough film with an adhesion layer, followed by continuous bonding of the tough film with an adhesion layer and the brittle film without take-up of the tough film.

In one embodiment, the blowing of the gas is performed on a support roll or a support base, the support roll or the support base being arranged on a side of the brittle film opposite to the tough film.

Advantageous Effects of Invention

According to the present invention, the tough film can be bonded to the brittle film while the breakage of the brittle film is prevented.

A production method for a film laminate of the present invention includes bonding a tough film having an elongated shape to a brittle film having an elongated shape while conveying the brittle film. The method of the present invention includes bonding the tough film and the brittle film to each other by bringing the tough film close to the brittle film, followed by blowing of a gas from a side of the tough film opposite to the brittle film. That is, the present invention is characterized in that pressing means, such as a nip roll, is not used at the time of the bonding of the brittle film and the tough film.

Figure 1:
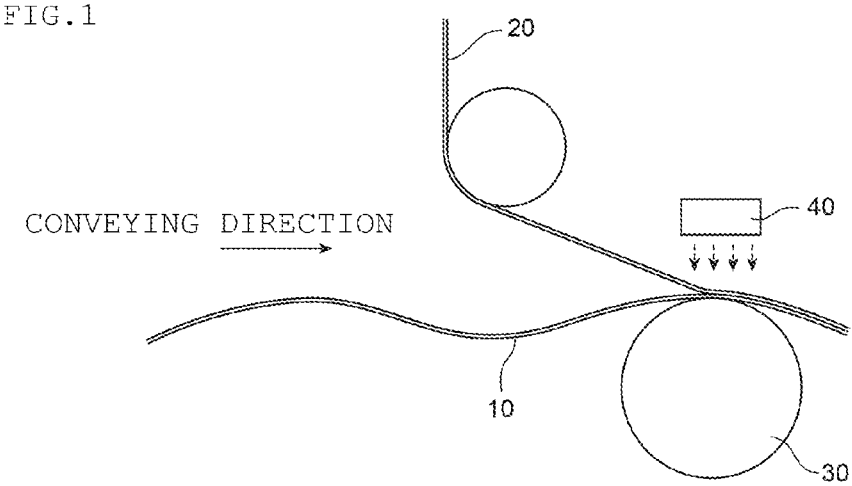
FIG. 1 is a schematic view for illustrating a production method for a film laminate according to one embodiment of the present invention.

FIG. 1 is a schematic view for illustrating a production method for a film laminate according to one embodiment of the present invention. In this embodiment, while a brittle film 10 having an elongated shape is conveyed, a tough film 20 is brought close to the brittle film 10 having an elongated shape from above the brittle film 10, and a gas is blown from above the tough film 20. The tough film 20 having an elongated shape is supplied so that the bonding of the brittle film 10 and the tough film 20 may be continuously performed. Although the brittle film 10 is conveyed in a horizontal direction in the illustrated example, the conveying direction of the brittle film 10 is not particularly limited, and the conveying direction may be set to, for example, an obliquely upward direction, an obliquely downward direction, a vertically upward direction, or a vertically downward direction. A method of conveying the brittle film is, for example, roll conveyance or belt conveyance.

A film having a fracture toughness value of from 0.1 MPa/m$^{1/2}$ to 10 MPa/m$^{1/2}$ may be used as the brittle film 10, and examples thereof include a glass film, a ceramic film, and a film formed of a brittle material, such as a semiconductor material or an acrylic resin. A fracture toughness value $K_{IC}$ is determined by: applying a tensile stress to an evaluation sample, which is obtained by making a crack having a length of 5 mm in an end portion (central portion) in the lengthwise direction of a brittle film having a predetermined size (measuring 2 cm wide by 15 cm long), in the lengthwise direction with an autograph (e.g., an autograph available under the product name "AG-I" from Shimadzu Corporation; chuck-to-chuck distance: 10 cm, tensile rate: 10 mm/rain); measuring a stress "σ" at the time of the rupture of the sample from the crack; and substituting the stress "σ", a crack length "a", and a sample width "b" into the following equation.

$$K_{IC}=\sigma(\pi a)^{1/2}F(a/b)\ F(a/b)=1.12-0.231(a/b)+10.55(a/b)^2-21.72(a/b)^3+30.39(a/b)^4$$

Typically, the brittle film 10 is a glass film. The glass film is produced, for example, as follows: a mixture containing a main raw material, such as silica or alumina, an antifoaming agent, such as mirabilite or antimony oxide, and a reducing agent, such as carbon, is melted at a temperature of from 1,400° C. to 1,600° C., and formed into a thin sheet shape, followed by cooling. A method of forming the glass film into a thin sheet is, for example, a slot down-draw method, a fusion method, or a float method. In one embodiment, the brittle film 10 (e.g., a glass film) formed into a thin sheet shape is subjected to the production method of the present invention as it is (i.e., without being taken up).

The thickness of the brittle film 10 is preferably 300 μm or less, more preferably from 20 μm to 300 μm, still more preferably from 20 μm to 200 μm, particularly preferably from 20 μm to 100 μm. In the present invention, even when an extremely thin brittle film (typically a glass film) is used, the breakage of the brittle film is prevented. The term "thickness of the brittle film" refers to the thickness of a portion to which the tough film is bonded.

The width of the brittle film 10 is preferably from 50 mm to 2,000 mm, more preferably from 100 mm to 1,000 mm.

The length of the brittle film 10 is preferably 100 m or more, more preferably 500 m or more. According to the present invention, a long brittle film is supplied, and hence the brittle film and the tough film can be continuously bonded to each other without the breakage of the brittle film.

In one embodiment, the brittle film 10 is conveyed while having waviness. In a conventional bonding method involving using pressing means, such as a nip roll, in the case where the brittle film is conveyed while having waviness, it is difficult to avoid the breakage of the brittle film at the time of its pressing. According to the production method of the present invention, however, even in such case, the brittle film and the tough film can be bonded to each other while the breakage of the brittle film is prevented. The phrase "conveyed while having waviness" as used herein refers to a state in which the brittle film is conveyed in a wave shape as illustrated in FIG. 1 when the brittle film is viewed from a side.

Figure 2:
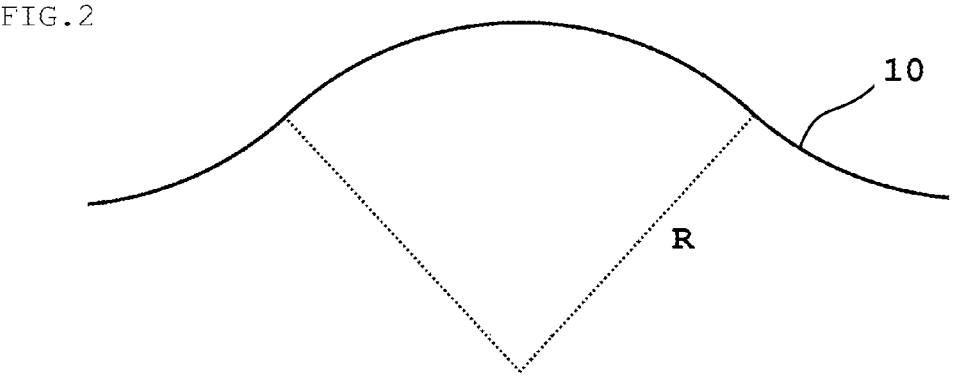
FIG. 2 is a view for illustrating the waviness of a brittle film to be subjected to the production method for a film laminate according to one embodiment of the present invention.

The waviness occurs owing to, for example, a material forming the brittle film and a production condition in a production process for the film, and its size is not particularly limited. When the waviness is represented by a radius of curvature R as illustrated in FIG. 2, the radius of curvature R is 0.3 mm or more in one embodiment, is 7 mm or more in another embodiment, is 17 mm or more in still another embodiment, and is 34 mm or more in still another embodiment. The upper limit of the radius of curvature R is, for example, 170 mm.

A film having a fracture toughness value larger than that of the brittle film may be used as the tough film 20. A film having a fracture toughness value of, for example, from 2 MPa/m$^{1/2}$ to 20 MPa/m$^{1/2}$ may be used as the tough film 20, and for example, a film including any appropriate tough material may be used. In one embodiment, a resin film is used as the tough film 20. Examples of a resin forming the resin film include polyethylene, polyvinyl chloride, polyethylene terephthalate, polyvinylidene chloride, polypropylene, polyvinyl alcohol, polyester, polycarbonate, polystyrene, polyacrylonitrile, an ethylene-vinyl acetate copolymer, an ethylene-vinyl alcohol copolymer, an ethylene-methacrylic acid copolymer, nylon, cellophane, and a silicone resin.

In one embodiment, the tough film is subjected as a tough film with an adhesion layer to the above-mentioned production method by being provided with an adhesion layer. Examples of a material forming the adhesion layer include an epoxy-based adhesive, a rubber-based adhesive, an acrylic adhesive, a silicone-based adhesive, and a urethane-based adhesive. In addition, a resin having a cyclic ether group, such as an epoxy group, a glycidyl group, or an oxetanyl group, may be used as the material forming the adhesion layer. In addition, a curable adhesive may be used. Herein, the adhesion layer is a concept including a pressure-sensitive adhesion layer and the adhesive is a concept including a pressure-sensitive adhesive.

In one embodiment, when the tough film with an adhesion layer is used, it is preferred that the tough film having an elongated shape be fed, and the adhesive be applied onto the tough film to form an adhesion layer, followed by continuous bonding of the tough film with an adhesion layer (laminate of the tough film and the adhesion layer) and the brittle film without the take-up of the tough film.

In another embodiment, after the tough film having an elongated shape (e.g., a tough film free of any adhesion layer) has been fed, and before the tough film and the brittle film are bonded to each other, the adhesive is applied onto the tough film and/or the brittle film.

As a method of applying the adhesive, there are given: coating methods, e.g., air doctor coating, blade coating, knife coating, reverse coating, transfer roll coating, gravure roll coating, kiss coating, cast coating, spray coating, slot orifice coating, calender coating, electrocoating, dip coating, and die coating; and printing methods, e.g., relief printing methods, such as flexographic printing, intaglio printing methods, such as a direct gravure printing method and an offset gravure printing method, litho printing methods, such as an offset printing method, and stencil printing methods, such as a screen printing method. When a curable adhesive is used, the adhesion layer may be cured after the tough film and the brittle film have been bonded to each other. A method for the curing is, for example, a method involving curing the adhesive through ultraviolet light irradiation and/or heat treatment. An irradiation condition for the ultraviolet light irradiation is typically as follows: a cumulative irradiation light amount is from 100 mJ/cm$^2$ to 2,000 mJ/cm$^2$, preferably from 200 mJ/cm$^2$ to 1,000 mJ/cm$^2$.

The adhesive strength of the tough film 20 to the brittle film 10 is preferably from 0.005 N/25 mm to 10 N/25 mm. The adhesive strength of the tough film may be adjusted by, for example, the material forming the adhesion layer. In one embodiment, when the tough film 20 needs to be re-peeled, the adhesive strength of the tough film 20 to the brittle film 10 is preferably from 0.005 N/25 mm to 1.0 N/25 mm, more preferably from 0.05 N/25 mm to 0.9 N/25 mm. The adhesive strength may be measured with a pressure-sensitive adhesive strength-measuring apparatus (e.g., an Instron-type tensile tester, manufactured by Shimadzu Corporation, AUTOGRAPH) under the conditions of a temperature of 23° C., a humidity of 50% RH, a peeling direction of 180°, and a peel rate of 300 mm/min after the lapse of 30 minutes from the bonding of the tough film to the brittle film.

The thickness of the tough film 20 is preferably from 3 μm to 250 μm, more preferably from 5 μm to 250 μm, still more preferably from 20 μm to 150 μm. When the tough film includes a base material and an adhesion layer, the thickness of the base material is preferably from 2 μm to 200 μm, more preferably from 10 μm to 100 μm, and the thickness of the adhesion layer is preferably from 1 μm to 50 μm, more preferably from 5 μm to 30 μm.

The ratio of the width of the tough film 20 to the width of the brittle film 10 is from 1% to 110%. The width of the tough film is set to any appropriate width in accordance with the purpose of the bonding of the tough film. For example, when it is intended to reinforce an end portion in the widthwise direction of the brittle film, the ratio of the width of the tough film to the width of the brittle film is preferably from 1% to 20%, more preferably from 2% to 15%. In addition, when the entire surface of the brittle film is reinforced, the ratio of the width of the tough film to the width of the brittle film is preferably from 80% to 110%, more preferably from 90% to 100%.

The length of the tough film 20 may be set to any appropriate length in accordance with the length of the brittle film 10.

The blowing of the gas is performed at a time point when the brittle film 10 and the tough film 20 are sufficiently close to each other. The gas may be blown before the brittle film 10 and the tough film 20 are brought into contact with each other, or the gas may be blown after the brittle film 10 and the tough film 20 have been brought into contact with each other. When the gas is blown before the brittle film 10 and the tough film 20 are brought into contact with each other, the blowing of the gas is performed at a site where a distance between the brittle film 10 and the tough film 20 (a distance before the blowing of the gas or a distance when the gas is not blown) is, for example, more than 0 mm and 100 mm or less (preferably more than 0 mm and 50 mm or less, more preferably more than 0 mm and 20 mm or less). The brittle film 10 and the tough film 20 are brought into contact with each other by the blowing of the gas, and hence the bonding of the brittle film 10 and the tough film 20 is completed.

In one embodiment, a support roll or a support base is arranged on the side of the brittle film 10 opposite to the tough film 20, and the blowing of the gas is performed on the support roll or the support base. With such procedure, the brittle film and the tough film can be satisfactorily bonded to each other without, for example, the inclusion of air bubbles. In FIG. 1, an example in which a support roll 30 is arranged on the side of the brittle film 10 opposite to the tough film 20 (i.e., below the brittle film 10) is illustrated.

The blowing of the gas may be performed with any appropriate gas jetting apparatus 40. In one embodiment, with a view to blowing the gas to the entire width of the tough film to be bonded, for example, a gas jetting apparatus including a plurality of gas jetting ports arrayed in its widthwise direction is used. In another embodiment, with a view to blowing the gas to a part (e.g., a central portion) in the widthwise direction of the tough film to be bonded, for example, a gas jetting apparatus including a plurality of gas jetting ports arrayed in its lengthwise direction is used. Such form is effective when the adhesive is applied to a part (e.g., a central portion) in the widthwise direction of the brittle film or the tough film, and the adhesive can be spread by blowing the gas to a site having applied thereto the adhesive. In addition, a gas jetting apparatus including a plurality of gas jetting ports arrayed in its widthwise direction and lengthwise direction may be used.

A gas pressure at the time of the blowing of the gas is preferably from 0.01 MPa to 1 MPa, more preferably from 0.05 MPa to 0.8 MPa, still more preferably from 0.1 MPa to 0.6 MPa. When the gas pressure falls within such range, the brittle film and the tough film can be satisfactorily bonded to each other while the occurrence of, for example, a wrinkle and air bubbles is suppressed.

A distance between the brittle film 10 and a gas jetting port 31 at the time of the blowing of the gas is preferably from 1 mm to 500 mm, more preferably from 1.5 mm to 100 mm, still more preferably from 2 mm to 50 mm. When the distance falls within such range, the brittle film and the tough film can be satisfactorily bonded to each other while the occurrence of, for example, a wrinkle and air bubbles is suppressed.

In one embodiment, as in the illustrated example, the jetting direction of the gas is substantially perpendicular to the plane (more specifically, the tangent plane at the collision position of the gas) of the brittle film 10. In this embodiment, the jetting angle of the gas with respect to the plane (tangent plane) of the brittle film 10 is preferably from 75° to 105°, more preferably from 80° to 100°, still more preferably from 85° to 95° in the conveying direction of the brittle film 10. In another embodiment, the jetting direction of the gas is an oblique direction with respect to the plane (tangent plane) of the brittle film 10. In this embodiment, the jetting angle of the gas with respect to the plane (tangent plane) of the brittle film 10 is preferably 30° or more and less than 75°, or more than 105° and 150° or less, more preferably from 45° to 70° or from 110° to 135° in the conveying direction of the brittle film 10. The angle as used herein refers to an angle determined by defining a counterclockwise direction with reference to the plane (tangent plane) direction of the brittle film when viewed from a side of the brittle film during its conveyance as a positive (+) direction. Therefore, the jetting of the gas at an angle of less than 90° (absolute value) with respect to the plane (tangent plane) direction of the brittle film corresponds to the jetting of the gas from a downstream side in the conveying direction of the brittle film toward an upstream side therein.

According to the present invention, the bonding of the brittle film and the tough film is completed as described above, and hence a laminate of the brittle film and the tough film can be obtained. According to the production method of the present invention, the tough film can be satisfactorily bonded to the brittle film while a load to be applied to the brittle film is extremely small. In one embodiment, the laminate of the brittle film and the tough film may be taken up in a roll shape. In another embodiment, the tough film is bonded for temporal protection of the brittle film (e.g., the protection of a slit portion at the time of the slitting of an end portion of the brittle film), and then the tough film is peeled before the take-up of the brittle film. In addition, in the production of the laminate of the brittle film and the tough film, a laminate including the tough film on each of both surfaces of the brittle film may be produced by using the above-mentioned bonding method twice.

EXAMPLES

Now, the present invention is specifically described by way of Examples. However, the present invention is by no means limited to these examples.

Example 1

While a glass film having an elongated shape (thickness: 100 μm, width: 500 mm, fracture toughness value: 0.7 MPa/m$^{1/2}$) was conveyed in a horizontal direction on a support roll, the adhesion layer side of a tough film with an adhesion layer was brought close to, and into contact with, the glass film from above the glass film, and a gas was blown from above the tough film with an adhesion layer (tough film side) at the contact point. The tough film with an adhesion layer includes a tough film formed of PET (thickness: 100 μm, width: 25 mm, fracture toughness value: 3 MPa/m$^{1/2}$) and an adhesion layer (thickness: 5 μm). The adhesion layer was formed by applying an epoxy-based adhesive to the tough film immediately before the glass film and the tough film were brought into contact with each other. In addition, a gas pressure was set to 0.4 MPa, and a distance between a gas jetting port and the glass film was set to 3 mm. The glass film was conveyed while having waviness having a radius of curvature R of 3 mm.

In this example, the glass film and the tough film having a length of 500 m or more were able to be continuously bonded to each other without the breakage of the glass film.

Comparative Example 1

The same glass film and tough film as those of Example 1 were used, and the films were bonded to each other between a pair of rolls (between a support roll and a nip roll). The rubber hardness of the nip roll was set to 70°, and a linear pressure to be applied between the rolls was set to 2,000 N.

In this comparative example, the breakage of the thin glass occurred, and hence the glass film and the tough film could not be satisfactorily bonded to each other.

INDUSTRIAL APPLICABILITY

The production method of the present invention can be suitably used as a substrate fora display element, a sealing material of an OLED element, a front protective sheet, or the like.

REFERENCE SIGNS LIST 10 brittle film
20 tough film

The invention claimed is:
1. A production method for a film laminate, comprising:
bonding a tough film having an elongated shape to a brittle film having an elongated shape while conveying the brittle film, by bringing the tough film close to the brittle film, and then
blowing of a gas from a side of the tough film opposite to the brittle film, the blowing of the gas being performed on a support roll or a support base, the support roll or the support base being arranged on a side of the brittle film opposite to the tough film,
wherein a gas pressure at a time of the blowing of the gas is from 0.01 MPa to 1 MPa, and
wherein the blowing of the gas comprises the blowing of the gas to the tough film before the brittle film and the tough film are brought into contact with each other.
2. The production method for a film laminate according to claim 1, wherein the brittle film has a thickness of from 20 μm to 300 μm.
3. The production method for a film laminate according to claim 1,
wherein the blowing of the gas is performed with a gas jetting apparatus including a gas jetting port, and
wherein a distance between the gas jetting port and the brittle film is from 1 mm to 500 mm.
4. The production method for a film laminate according to claim 1, wherein a ratio of a width of the tough film to a width of the brittle film is from 1% to 110%.
5. The production method for a film laminate according to claim 1, wherein the tough film has an adhesive strength to the brittle film of from 0.005 N/25 mm to 10 N/25 mm.
6. The production method for a film laminate according to claim 1, prior to the bonding of the tough film and the brittle film, the method further comprises:
feeding the tough film, and
applying an adhesive onto the tough film and/or the brittle film.
7. The production method for a film laminate according to claim 1,
wherein an adhesion layer is disposed on the tough film, and
wherein, prior to the bonding of the tough film and the brittle film, the method further comprises:
feeding the tough film, and
applying an adhesive onto the tough film to form the adhesion layer, and
wherein the bonding of the tough film with the adhesion layer and the brittle film is continuous and is performed without take-up of the tough film.

* * * * *